United States Patent [19]

Manojlovic

[11] Patent Number: 4,684,471

[45] Date of Patent: Aug. 4, 1987

[54] PROCESS FOR WATER PURIFICATION, AND A FILTER FOR CARRYING OUT THE PROCESS

[76] Inventor: Vladimir Manojlovic, Jurija Gagarina 162/25, 11070 Novi Beograd, Yugoslavia

[21] Appl. No.: 819,829

[22] Filed: Jan. 17, 1986

[51] Int. Cl.⁴ ............................................. C02F 9/00
[52] U.S. Cl. .................................. 210/665; 210/668; 210/694; 210/798; 210/474
[58] Field of Search ............................. 210/665–669, 210/678, 694, 702, 723, 754, 764, 793–795, 806, 807, 257.1, 266, 282, 455, 464, 474, 501, 502.1, 797, 798

[56] References Cited

U.S. PATENT DOCUMENTS

| | | | |
|---|---|---|---|
| 3,169,112 | 2/1965 | Nelson | 210/282 |
| 3,327,859 | 6/1967 | Pall | 210/282 |
| 3,392,837 | 7/1968 | Sanzenbacher | 210/282 |
| 3,715,035 | 2/1973 | Teeple et al. | 210/282 |
| 4,219,420 | 8/1980 | Muller | 210/798 |
| 4,277,343 | 7/1981 | Paz | 210/754 |

Primary Examiner—Ivars Cintins
Attorney, Agent, or Firm—Fleit, Jacobson, Cohn & Price

[57] ABSTRACT

A process for water purification, intended for the purification of impure water to drinking water condition, composed of mixing 20–50 mg/l of a coagulant and 2–5 mg/l of an activated charcoal with a quantity of impure water, passing the water through a filter medium composed of thoroughly cleaned plastic fibers of polyacrylonitrile having a fineness of 4.5–9.0 deniers and a staple fiber length of 100–150 mm and a porosity of 78–85%, and treating the filtrate with active chlorine in an amount sufficient to render the filtrate potable and filtering apparatus to carry out the process.

4 Claims, 2 Drawing Figures

PROCESS FOR WATER PURIFICATION, AND A FILTER FOR CARRYING OUT THE PROCESS

SUMMARY OF THE INVENTION (a) Field of technique the invention belongs to

This invention is intended for the purification of drinking water for hunters, fishermen, campers and for various emergencies like earthquakes, floods, massive epidemics of contagious diseases, wars, etc.

(b) Technical problem

Presently in the world, there exist, for the above mentioned purposes, devices with activated charcoal, asbestos-cellulose, diatomaceous earth and various filtering papers as filtering materials. However, these devices, in spite of their good features, have a basic shortcoming: these filtering materials cannot be regenerated, i.e. cleaned-washed and reused; after pollution they have to be replaced by new materials (the used filtering material is thrown away) after being used for 1-2 hours. This requires the supply of big quantities of new filtering materials (the consumption is relatively big) and permanent transport to the place of application. Moreover, the devices are rather heavy for transport and relatively expensive. In addition, these materials in exceptional situations, particularly in war, can present critical materials because their production is connected to defined industry or starting points (possibility of destruction of industry, deposits, transport ways and the like).

(c) State of the art

Known portable devices most widely used in the world today, are sand filters, diatomaceous filters, asbestos-cellulose filters, filters of porous baked elements, linen filters as well as various combinations of these materials.

Already in World War I, modern Armed Forces used mobile sand filters having a surface area of about 0.14 sq.m. with a filtration rate of 40-60 l/min. But, today these filters are very seldom used because they have proven to be unsuitable due to their relatively big weight.

Apart from sand filters, during World War II, so-called diatomaceous filters were used but such use was very often for a smaller number of consumers, mainly for requirements of Armed Forces in field conditions, as well as, for purification of water in swimming pools. They are even used today for this purpose. These devices consist of closed steel cylinders in which are inserted perforated pipes wrapped by steel wire (or rings) containing pulp of diatomaceous (Fuller's) earth as the filtering material. These filters are usually made for capacities from 75-120 l/min. per square meter of filter surface.

Asbestos-cellulose filters are made of various capacities, most often 75 l/h, 150 l/h and 550 l/h. They are used for the water supply of individuals and smaller groups of people. Their weight is from 18-80 kgs. Duration of one filtering paper composed of asbestos-cellulose is about 2 hours.

Filters of porous baked elements (metal, china, plastic material) are made with very fine pores. Their capacity is relatively small and pressure losses are large (a few atmospheres). After clogging, filter elements can be taken off and exposed to steam in order to be washed, but washing is never efficient enough so it often happens that they cannot be used again.

Linen filters are often used as filtering materials, but the quality of water purification achieved by these filters is quite low. Such devices are used only as an improvisation for water purification and, therefore, used only for a short time.

Basic shortcomings of devices using the stated filtering materials, as already mentioned, are that they cannot be regenerated i.e. cleaned-washed and reused. Also, for filtering through these materials only waters not too impure can be considered as starting liquids. Besides, it is proved that asbestos fibers cause cancer and filters in which this material is used are already being put out of use throughout the world.

(d) Description of the solution of technical problem

The above mentioned shortcomings can be eliminated by the present invention through the use of devices which employ a filtering media composed of plastic fibrous material which has been thoroughly cleaned by any conventional and known means and reagents. With this cleaned media, relevant chemicals with predetermined concentrations (coagulant, activated charcoal, chlorine product) are used in pre- and post-treatments.

Numerous and long-term testing has shown that this type of filtering material when used with the mentioned additives produces an exceptionally good filtrate (potable), and, according to its tactical and economic properties, is far better in performance than one can achieve with the usual filtering materials, such as, asbestos-cellulose, sand, diatomaceous earth, etc.

Advantages of the proces and devices of the present invention which use the technology disclosed herein to achieve purification of water are multifold:

a high degree of purification is achieved;

relatively small quantity of filtering material is needed (layer height is only 7-8 cms), so devices according to the invention have small volume and are very light and easily transportable;

the filtering material is durable, i.e. it is not thrown away after use, but regenerated—cleaned very simply and very rapidly for reuse. The regeneration—cleaning is performed by opposite direction water flow (backwashing) in conjunction with air under pressure which can be supplied via a small hand pump. Time needed for regeneration is 10-15 sec. and is performed periodically after each 1-2 hours of device operation.

The essence of the solution of technical problem is the utilization of thoroughly cleaned plastic fibrous material (media) (polyacrylonitrile fibers, fineness from about 4.5-9.0 Denier, staple length: from about 100-150 mm, porosity of formed filter from about 78-85%). Prior to filtering, known coagulants, such as, albumin, are added to the impure water in a quantity of from about 20-50 mg/l and known absorbents and adsorbents, such as powdered activated charcoal, are added to the impure water in a quantity of from about 2-5 mg/l. The raw waters to be treated may be taken from rivers, lakes, pools or other sources. After a short mixing (1-30 seconds, preferably 5-6 secs) of the raw water to which additives have been added, as stated, the water is passed through the portion of the device where the filtering material of plastic fibrous material is contained. From 98-100% of the suspended particles and microorganisms are retained in the filtering medium, as well as, the large part of other dissolved, precipitated or coagulated constituents such as: compounds of iron, manganese, and magnesium, ammonia, nitrates, other salts, etc.

Water collected from the filtering medium is then treated with from about 1–2 mg/l of known active chlorine materials (natrium-hypochlorite, kaporite and the like). A sufficient amount is added to the water to kill any remaining germs and obtain a value of residual chlorine in the water from about 0.2–0.5 mg/l. This will prevent the possibility of a secondary pollution of the already disinfected purified water.

The process of the present invention for improvement of water quality may be carried out by a novel device or apparatus consisting of two main parts: one in which the filtering media or material (filter) is located, and another for the accumulation of the purified water (vessel for pure water). When the device is operated in a dischargeable mode, regeneration, only the part of the device where the filtering material is contained is used. When the device is used for purifying, both parts of the device are used.

DESCRIPTION OF DRAWING

The figures of the drawing show a preferred construction of the device following the teachings of the invention and in which.

DETAILED DESCRIPTION

Figure 1:
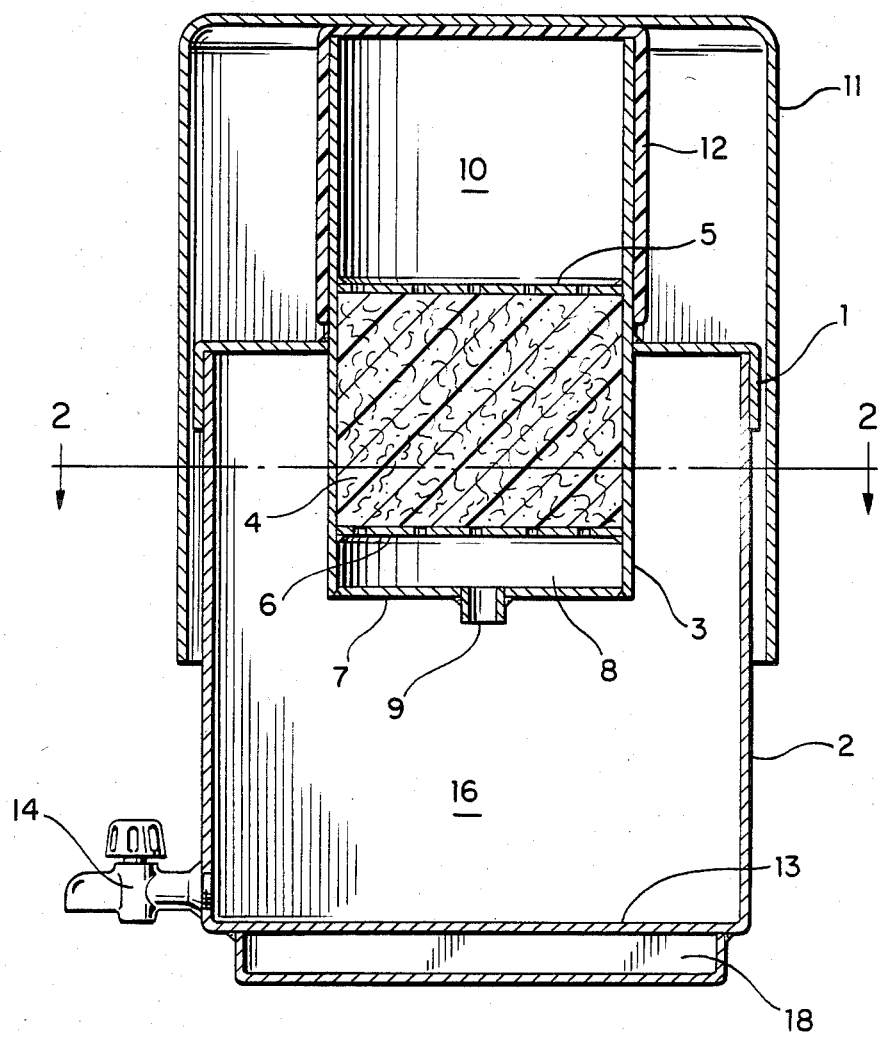
FIG. 1 shows in vertical cross-section the device.
Figure 2:
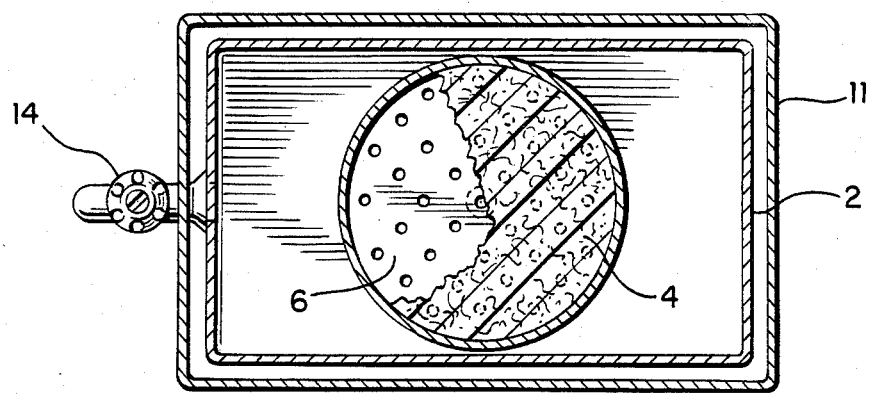
FIG. 2 is a view taken in horizontal section along line 2—2 of FIG. 1.

The following is a description of a preferred embodiment of the invention. Referring to FIG. 1, a lid 1 closes the open top of vessel 2 which may have any geometrical shape, but is preferably a parallelepiped. A built-in filter container 3, cylindrical in shape, contains filtering material 4 made of plastic fibrous material placed between two spaced perforated plates 5 and 6. The plates 5 and 6 are fixed to the inner surface of container 3. The porosity of the filtering material is from about 78–85%. A bottom 7 is welded to the lower end of the container 3 spaced below the lower perforated plate 6, forming a filtering chamber 8 between the lower perforated plate 6 and bottom 7, into which the filtrate, clean water passes during the filtering process. A short pipe 9 is fixed to the bottom 7 (or to the side of filter 3, between the lower perforated plate 6 and the bottom 7); this pipe 9 allows and enables clean water in container 3 to pass into the vessel 2. Pipe 9 is also used as a connection between a hand operated air pump using, for example, a rubber bulb to introduce pressurized air into the filter media during cleaning of the filtering material i.e. regeneration or exhausting of impurity from the filtering material 4. The top of filter container 3 receives and is closed by a cup shaped lid 12. The filter container 3 is mounted on lid 1 as shown in FIG. 1. A cup shaped lid 11 is received on and closes the open top of container 2. Lid 11 may be used for bringing or pouring crude impure water into the space 10 of the filter container 3 provided above perforated plate 5 to initiate operation of the device. Space 10, apart from being used for acceptance of crude water during the process of water filtering, may be used also for storing bottles with additives (chemicals) when solutions are used or tablets when solid state storage is needed. The lower part of vessel 2 provides a space 16 to receive the filtrate, clean water. Immediately above the bottom 13 of vessel 2, is fixed by any suitable means, such as, threading and a nut, stop valve-cock 14 for draining pure water from space 16. Base 18 is provided on the bottom of vessel 2.

The device functions in the following way:

First lid 11 is taken off and crude water (from any source such as a river, lake, pool) is poured into inverted lid 11. Then, a mixture of a known coagulant in a quantity of about 20–50 mg/l and activated charcoal in powder form in a quantity of about 2–5 mg/l are added to the water in lid 11. Then, after a short mixing, 5–6 secs., the water with admixed additives is poured into space 10 at the top of filter container 3 after having first removed the lid 12. The water in space 10 passes through plate 5, filtering material 4 made of thoroughly cleaned plastic fibrous material where it is liberated almost completely from suspended matter and microorganisms (98–100%) as well as the large part of other impurities or undesirable ingredients in the crude water, and finally, through plate 6 to flow into space 8. By pipe 9 it is directed into vessel 2. The filtered water in vessel 2 is then mixed with the necessary amount of active chlorine, 1–2 mg/l, previously put into the vessel 2, in the form of a chlorine solution or chlorine tables. The amount used is sufficient to kill the remaining germs or microorganisms in the water. Optionally, the chlorine can be added after the water is withdrawn through spigot 14. After the contact between the chlorine and water, which usually takes about 15–20 minutes, the water can safely be used for drinking and for other needs.

After a couple of hours of device operation (the time depends on the degree of pollution of crude water) the filtering material 4 must be cleaned or regenerated. The cleaning is done in the following way: filter container 3 is first separated from the vessel 2. Then, it is turned upside-down, and clean water put into the filter material 4, an air hand pump actuated by a rubber bulb is connected with pipe 9 and pressurized air is forced into chamber 8 pushing the water and all dirt accumulated in the filtering material 4, especially at the upper surface of the filtering material 4 (nearest plate 5) out of the filter media into space 10. Lid 12 serves as a receptacle of the water which remained in the filtering material 4, and is pumped out i.e. ejected out of the filter 3 may be disposed of in any suitable fashion. Also, the filter material and may be first backwashed and then subjected to pressurized air.

During device operation i.e. during the process of water filtering, the lid 1 with the filter container 3 mounted in it covers the vessel 2 for clean water; however, during the cleaning of the filtering material 4, the lid 1 together with the filter 3 is separated from the vessel 2 for clean water. Lids 11 and 12 together cover the device only when it is out of operation.

Although the invention has been described in terms of a preferred embodiment, changes and modifications will occur to those skilled in the art which do not depart from the spirit or scope of the invention. Such changes and modifications are deemed to fall within the purview of the invention.

What is claimed:

1. A process for water purification, intended for the purification of impure water to drinking water condition comprising the steps of
    mixing from about 20–50 mg/l of a coagulant and from about 2–5 mg/l of an activated charcoal with a quantity of impure water as a first step in the purification of the impure water,
    passing the water through a filter medium composed of thoroughly cleaned plastic fibers of polyacrylonitrile having a fineness of from about 4.5–9.0 deniers and a staple fiber length of from about 100–150 mm and a porosity of from about 78–85%, and treating the filtrate with active chlorine in an amount sufficient to render the filtrate potable.

2. The process of claim 1 wherein the chlorine is added in an amount from about 1–2 mg/l.

3. The process of claim 1, wherein the further step of regenerating the filter medium is periodically undertaken and comprises back washing the filter media and subjecting same to pressurized air.

4. Filtering apparatus comprising an open end main vessel, an open end filter container mounted in the upper part of the main vessel with the open end up, two vertically spaced perforated plates mounted in the filter container, a plastic fibrous material contained between the perforated plates, said fibrous material being regenerable, a chamber defined between the lower perforated plate and the bottom of the filter container, means to pass liquid from said chamber to the lower part of said vessel which serves as a receptacle for clean water and as the place where clean water can be chlorinated, the portion of the filtering container above the upper perforated plate serving as a chamber to receive impure water, a lid received on the filter container to close the open end of the filter container, a second lid to close the open end of the main vessel, and means to withdraw clean, chlorinated water from the lower part of the main vessel after the water has passed from the portion of the filter container above the upper perforated plate, through the upper perforated plate, said plastic fibrous material, and the lower perforated plate into the lower part of the main vessel.

* * * * *